US007061884B2

(12) United States Patent
Shepherd et al.

(10) Patent No.: US 7,061,884 B2
(45) Date of Patent: Jun. 13, 2006

(54) METHODS AND SYSTEMS FOR COMMUNICATING DATA AT RADIO BASE STATION NODES THAT PROVIDE EFFICIENT ALLOCATION OF CONTROL TIMESLOTS

(75) Inventors: Johnny Shepherd, Hillsborough, NC (US); Joseph Repice, Apex, NC (US); John Wilcox, Morrisville, NC (US)

(73) Assignee: Ericsson Inc., Research Triangle Park, NC (US)

( * ) Notice: Subject to any disclaimer, the term of this patent is extended or adjusted under 35 U.S.C. 154(b) by 928 days.

(21) Appl. No.: 10/011,669

(22) Filed: Oct. 29, 2001

(65) Prior Publication Data

US 2003/0081566 A1 May 1, 2003

(51) Int. Cl.
*H04Q 7/00* (2006.01)

(52) U.S. Cl. .................. 370/328; 455/422.1; 455/524; 455/561; 455/460; 370/421; 370/423; 370/458; 370/470

(58) Field of Classification Search ................ 370/328, 370/345, 473, 277, 310, 376, 421, 423, 451, 370/459, 464, 489, 913, 470, 378, 381, 402, 370/458, 438; 455/422.1–460, 524–525, 455/244.1, 25, 67.14, 101, 561
See application file for complete search history.

(56) References Cited

U.S. PATENT DOCUMENTS

| 5,526,397 | A | 6/1996 | Lohman |
| 5,909,469 | A | 6/1999 | Frodigh et al. ............. 375/302 |
| 6,108,316 | A | 8/2000 | Agrawal et al. ............. 370/311 |
| 6,138,037 | A | 10/2000 | Jaamies ...................... 455/560 |
| 6,141,535 | A | 10/2000 | Ayerst ....................... 455/31.1 |
| 6,317,423 | B1 | 11/2001 | Jantti et al. .................. 370/347 |
| 6,496,694 | B1 | 12/2002 | Menon et al. |
| 6,668,161 | B1 * | 12/2003 | Boros et al. ............. 455/67.14 |
| 6,826,386 | B1 * | 11/2004 | Doi ............................. 455/25 |
| 2002/0082014 | A1 | 6/2002 | Andersson et al. |
| 2003/0036401 | A1 | 2/2003 | Leppa et al. |
| 2003/0139152 | A1 * | 7/2003 | Doi et al. .................... 455/101 |

(Continued)

FOREIGN PATENT DOCUMENTS

EP 0830 041 3/1998

(Continued)

OTHER PUBLICATIONS

International Search Report of PCT/US 02/32293 filed Oct. 15, 2002.

(Continued)

*Primary Examiner*—Wellington Chin
*Assistant Examiner*—Jamal A. Fox
(74) *Attorney, Agent, or Firm*—Myers Bigel Sibley & Sajovec

(57) ABSTRACT

A first frame of carrier data can be communicated between a first carrier interface of a first radio base station node and a mobile switching center over a first carrier bus. In addition, a first frame of bus data can be communicated having a first number of dedicated control timeslots at a first bus interface of the first radio base station node over a first radio base station bus. Furthermore, a second frame of carrier data can be communicated between a second carrier interface of a second radio base station node and the mobile switching center over a second carrier bus. Finally, a second frame of bus data having a second number of dedicated control timeslots, different from the first number of dedicated control timeslots, can be communicated at a second bus interface of the second radio base station node over a second radio base station bus.

26 Claims, 5 Drawing Sheets

U.S. PATENT DOCUMENTS

2004/0028015 A1    2/2004  Fouilland et al.
2005/0094667 A1*  5/2005  Dahlman et al. ........... 370/473

FOREIGN PATENT DOCUMENTS

| | | |
|---|---|---|
| EP | 0899 899 | 3/1999 |
| WO | WO 94/22245 * | 9/1994 |

OTHER PUBLICATIONS

International Search Report of PCT/US 02/33760 filed Oct. 22, 2002.

Fabio Longoni et al; *Radio Access Network Architecture; WCDMA for UMTS Access for Third Generation Mobile Communications; John Wiley & Sons, GB*, pp. 53-71 XP-002228672.

* cited by examiner

METHODS AND SYSTEMS FOR COMMUNICATING DATA AT RADIO BASE STATION NODES THAT PROVIDE EFFICIENT ALLOCATION OF CONTROL TIMESLOTS

RELATED APPLICATIONS

The present application is related to U.S. application Ser. No. 10/011,666 entitled SYSTEMS AND METHODS FOR COMMUNICATING DATA AT RADIO BASE STATION NODES and filed concurrently herewith. The disclosure of U.S. application Ser. No. 10/011,666 is hereby incorporated herein in its entirety by reference.

BACKGROUND OF THE INVENTION

The present invention relates to the field of communications and more particularly to radio communications.

In conventional radio telephone communications systems, control, voice, and data information from a mobile switching center is received at a radio base station via a carrier protocol such as a T1, E1, or J1 carrier protocol. Each carrier protocol can support a fixed number of channels or timeslots within a frame for communicating control, voice, and data information between the mobile switching center and a radio base station over a carrier bus. For example, the T1 carrier protocol can support 24 channels or timeslots per frame. Within a radio base station, the control, voice, and data information from the mobile switching center is received at a control board interface, and portions of this data can be communicated with other base station control boards and/or other base station devices over a radio base station bus using a bus interface of the same type as that used for the carrier from the mobile switching center. Thus, for example, a radio base station bus corresponding to the T1 carrier protocol discussed above would support 24 timeslots per frame.

Typically, the mobile switching center communicates control information to the radio base station over a control signaling link (CSL) (64 kb/s PCM timeslots). Conventional systems typically use a control radio interface (CRI) that supports a single CSL for all control information communicated between the mobile switching center and the radio base station. A single CSL occupies one timeslot per frame on the carrier bus or, in other words, 1/24 timeslots per frame is dedicated to control information. Control information is typically passed between base station control boards over the radio base station bus. A conventional CRI dedicates one timeslot per frame on the radio base station bus to control information.

More recently, a new control radio interface, CRI2, has been developed which allows up to four timeslots per frame on the carrier bus to be dedicated to control information. CRI2 supports a fixed number of five dedicated control timeslots per frame on the radio base station bus. Accordingly, bandwidth on the radio base station bus may be wasted.

SUMMARY OF THE INVENTION

According to embodiments of the present invention, methods and systems are provided for communicating data in a radio communications system. A first frame of carrier data can be communicated between a first carrier interface of a first radio base station node and a mobile switching center over a first carrier bus. In addition, a first frame of bus data can be communicated having a first number of dedicated control timeslots at a first bus interface of the first radio base station node over a first radio base station bus. Furthermore, a second frame of carrier data can be communicated between a second carrier interface of a second radio base station node and the mobile switching center over a second carrier bus. Finally, a second frame of bus data having a second number of dedicated control timeslots, different from the first number of dedicated control timeslots, can be communicated at a second bus interface of the second radio base station node over a second radio base station bus.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
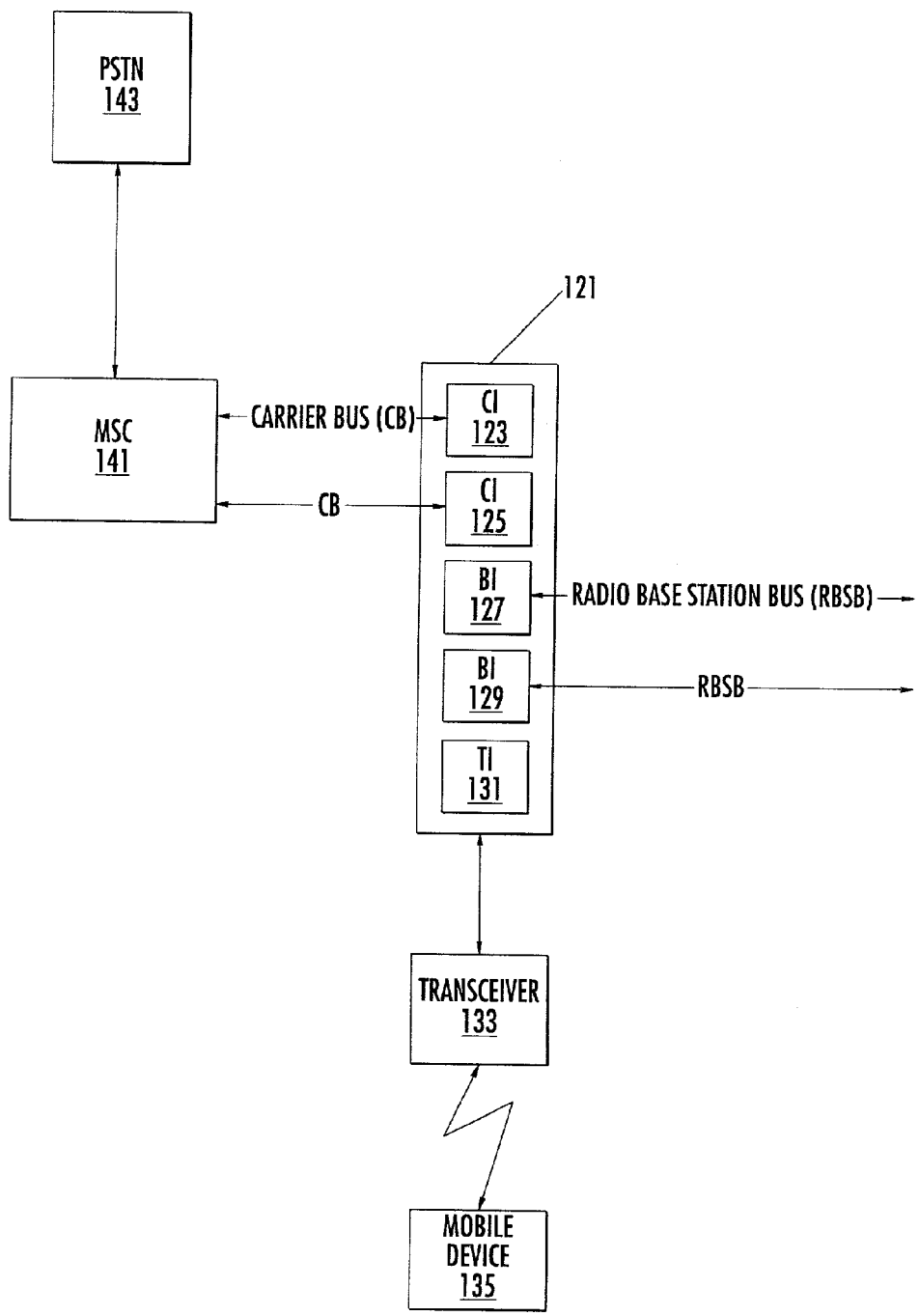
FIG. 1 is a block diagram illustrating radio base station nodes and methods according to embodiments of the present invention.

As shown in FIG. 1, a radio base station of a radiotelephone communications system can include a radio base station node 121 with carrier interfaces (CI) 123 and 125, bus interfaces (BI) 127 and 129, and transceiver interface (TI) 131. As shown, each carrier interface can be used to communicate carrier data with the mobile switching center (MSC) 141 over respective carrier buses (CBs), and each bus interface can be used to communicate bus data with other radio base station nodes over a radio base station bus (RBSB). In addition, transceiver data for the transceiver 133 can be communicated between the radio base station node 121 and the transceiver 133 through the transceiver interface 131. Accordingly, the radio base station node 121 can support wireless communications with one or more user terminals through transceiver 133 and the mobile switching center 141, the Public Switched Telephone Network (PSTN) 143, and/or another radio base station node.

Frames of carrier data, i.e. voice, data and/or control information, may be communicated between one or more carrier interfaces 123 and 125 of the radio base station node 121 and the mobile switching center 141 according to a carrier protocol, and frames of bus data can be communicated between one or more bus interfaces 127 and 129 of the radio base station node 121 and one or more other radio base station nodes according to a radio base station protocol. For example, each carrier bus between the base station node and the mobile switching center and each radio base station bus can be operated according to one of the T1 protocol (standard in the U.S.), the J1 protocol (standard in Japan), and the E1 protocol (standard in Europe). A more detailed description of these protocols and their relationship with one another may be found in related U.S. application Ser. No. 10/011,666 entitled SYSTEMS AND METHODS FOR COMMUNICATING DATA AT RADIO BASE STATION NODES filed concurrently herewith, which is hereby incorporated herein by reference in its entirety.

According to embodiments of the present invention, frames of carrier data communicated between a mobile switching center and a radio base station node over a carrier bus (CB) contain a first number of dedicated control channels, i.e. timeslots, per frame. In particular, according to control radio interface 2 (CRI2), up to 4 control timeslots per frame may be fixed on the carrier bus for control information communicated from the mobile switching center to the radio base station. The determination of the number of timeslots allocated to control information for each carrier bus may be determined based on the system configuration, paging and messaging requirements and the like. In a typical system, one or two dedicated control timeslots per frame may be provided on the carrier bus, but up to four dedicated control timeslots per frame may be provided on a carrier bus.

Furthermore, frames of bus data communicated over the radio base station bus (RBSB) may contain a second number of dedicated control timeslots. According to embodiments of the present invention, the number of dedicated control timeslots per frame on the radio base station bus can be determined based upon the number of dedicated control timeslots on the carrier bus. For example, the number of dedicated control timeslots on the carrier bus may be equal to the number of dedicated control timeslots on the radio base station bus. Thus, if the carrier bus has two dedicated control timeslots, at least two dedicated control timeslots would be provided on the radio base station bus.

Alternatively, the relationship between control timeslots on the carrier bus to control timeslots on the radio base station bus may be defined by the equation:

$$TS2 = TS1 + 1 \qquad (1)$$

where TS2 is the number of dedicated control timeslots on the radio base station bus and TS1 is the number of dedicated control timeslots on the carrier bus. An extra control timeslot may be provided on the radio base station bus to, for example, accommodate for header information included in the carrier bus control information that may overflow into an extra timeslot on the radio base station bus. It will be understood that although the above description of the present invention is described with respect CRI2, it should not be limited to this configuration. In particular, embodiments of the present invention should not be limited to the specific numbers of dedicated control timeslots discussed above, and other numbers of dedicated control timeslots may be employed without departing from the spirit of the present invention.

It will be understood that the present invention may be implemented in software. For example, the number of dedicated control timeslots per frame on the radio base station bus may be assigned by an operator issued command. Alternatively, the number of dedicated control timeslots per frame could be selected based on a load-based algorithm so that timeslots become available when the signaling drops below a certain threshold. Using software to implement the present invention may improve the flexibility of the system by allowing the number of dedicated control timeslots per frame to vary based on system requirements. It will be further understood that although the system may be shut down to change the number of dedicated control timeslots on the carrier bus, embodiments of the present invention should not be limited to this configuration. Therefore, real time changes of timeslot allocation on a frame to frame basis on both the carrier bus and the radio base station bus are within the scope of the present invention.

The control data communicated between the radio base station node 121 and the mobile switching center 141 using control timeslots over one or more carrier buses can include operation and maintenance ("O&M") data for the radio base station node 121 and other radio base station nodes coupled to the bus interfaces 127 and 129. The control data can further include messaging data such as short message service (SMS) data and/or pages for user terminals serviced by the transceiver 133 or other transceivers associated with other radio base station nodes coupled to the radio base station buses. According to aspects of the present invention, all control data communicated over the carrier buses can be communicated over the radio base station buses whether the control data is for use by the radio base station node 121 or for use by another radio base station node coupled to the radio base station buses.

While the radio base station node 121 of FIG. 1 is illustrated with two carrier interfaces 123 and 125 each coupled to the mobile switching center 141 via respective carrier buses, a radio base station node according to the present invention can include only a single carrier interface or a radio base station node according to the present invention can include three or more carrier interfaces. Moreover, a radio base station node according to the present invention can include unused carrier interfaces that are not coupled to the mobile switching center. A radio base station node according to the present invention, for example, may include two carrier interfaces, one of which may be unused if the additional capacity is not required for the application for which it is being used. A radio base station node in a relatively high traffic base station may require coupling of all carrier interfaces, while a radio base station node in a lower traffic base station may not have carrier buses coupled to all carrier interfaces.

The radio base station node 121 may also support more than one transceiver. Alternatively, a radio base station node according to the present invention may not have any transceivers coupled thereto. A radio base station node, for example, may be used to provide additional capacity and/or redundancy with respect to carrier buses to the mobile switching center without requiring coupling of a transceiver directly thereto. In a radio telephone communications system with sufficient transceivers, an additional radio base station node could be added into a radio base station bus to provide additional buses to the mobile switching center without adding an additional transceiver.

The radio base station node 121 can be provided on a single control board and/or circuit. Alternatively, the functionality of the radio base station node can be provided on multiple boards and/or circuits. In addition, a board and/or circuit providing functionality of the radio base station node can provide additional functionality.

Radio base station nodes according to embodiments of the present invention can support dedicated control timeslots on the carrier bus and the radio base station bus based on the requirements of the particular system. For example, the number of dedicated control timeslots on the carrier bus may be based on system configuration, paging and messaging requirements and the like. Accordingly, the number of control timeslots on the radio base station bus is not fixed at a certain number of dedicated control timeslots, thus avoiding the occurrence of unused timeslots dedicated to control information present in conventional systems. For example, the carrier interfaces 123 and 125 may support 24 PCM timeslots per frame according to the T1 protocol and two of these 24 PCM timeslots may be allocated for control information. According to this example, the radio base station bus will support up to three dedicated control timeslots on the radio base station bus. Thus, embodiments of the present invention may provide extra timeslots for voice and/or data traffic that would not be available in a conventional system with five fixed timeslots dedicated to control information because, typically, dedicated control timeslots would not be useful for voice and data traffic. The number of timeslots available for passing voice and data traffic between radio base station nodes can thus be increased.

Figure 2:
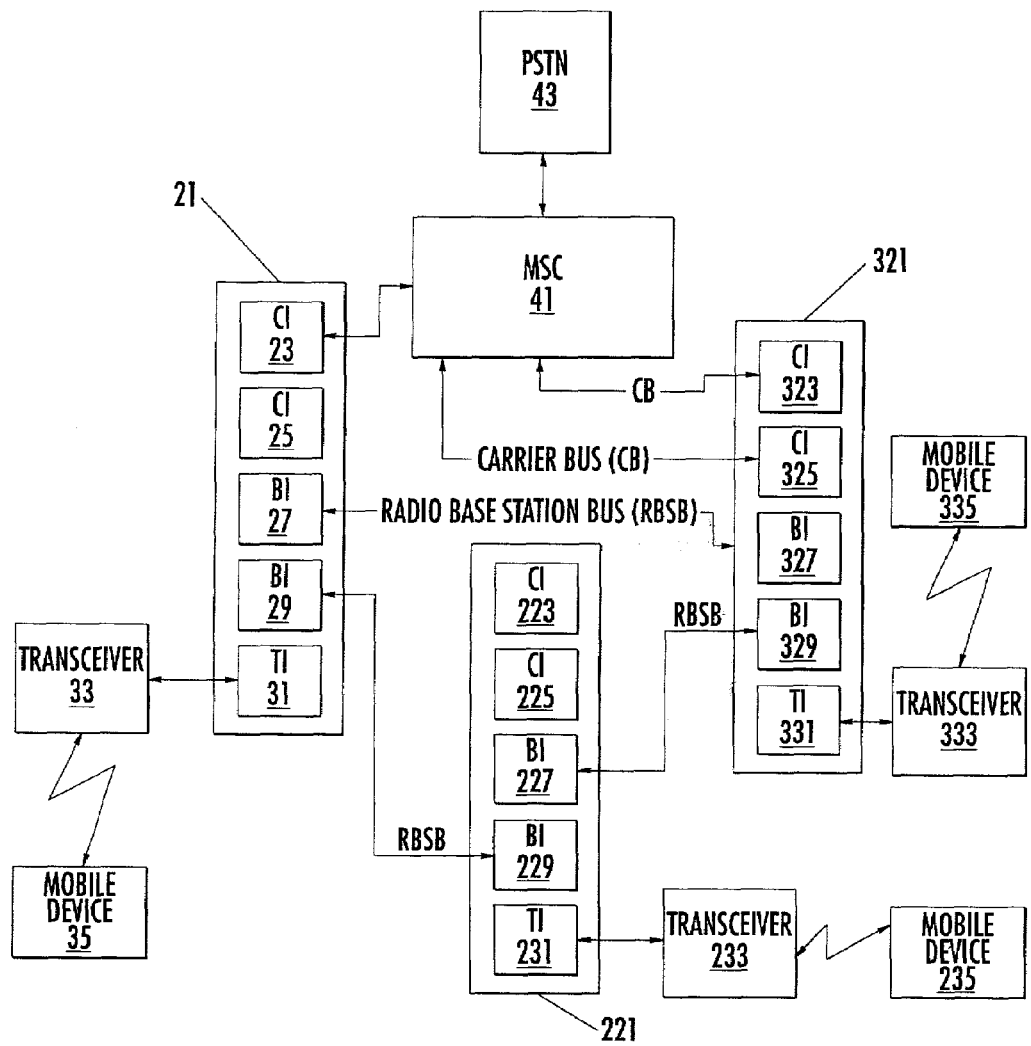
FIG. 2 is a block diagram illustrating radio communications systems and methods according to embodiments of the present invention.

A radio telephone communications system including a plurality of radio base station nodes 21, 221, and 321 is illustrated in FIG. 2. As shown, each radio base station node 21, 221, and 321 can be associated with a respective transceiver 33, 233, and 333 to provide wireless communications with respective user terminals 35, 235, and 335. While a single user terminal is shown in communication with each transceiver, it will be understood that each transceiver may provide communications with a plurality of user terminals and that there may be times when a transceiver is not providing communications with any user terminals. In the example of FIG. 2, each transceiver or transceiver group may be used to provide service over a 120 degree sector of a single radio base station so that each of the illustrated transceiver groups and radio base station nodes is part of a single base station. Alternatively, one or more of the radio base station nodes and transceiver groups may be part of a separate base station. In addition, the radio base station bus can be used to couple any number of radio base station nodes. A system according to the present invention may also include additional radio base station nodes defining separate radio base station buses.

As shown in FIG. 2, each radio base station node coupled by the radio base station bus can be coupled to no carrier buses (radio base station node 221), coupled to a single carrier bus (radio base station node 21), or coupled to more than one carrier bus (radio base station node 321) according to levels of capacity and/or redundancy desired for each radio base station node. The mobile switching center 41 can communicate control and user payload information over each of the carrier buses with the carrier interface 23 of radio base station node 21 and the carrier interfaces 323 and 325 of radio base station node 331. Frames of carrier data including timeslots of control data can be communicated over a carrier bus at either radio base station node 21 or 321. Frames of bus data including timeslots of control data may further be communicated over the radio base station bus with each of the radio base station nodes so that all radio base station nodes on the radio base station bus receive all control data. In particular, each of the base station nodes has access to all the control information on the radio base station bus and only extracts the information that is useful to that particular base station node.

Not all user payload data, however, is necessarily communicated over the radio base station bus. User payload data communicated using carrier interface 23 to support communications with user terminal 35 using transceiver 33, for example, may not be communicated over the radio base station bus thereby preserving bandwidth on the radio base station bus. User payload data communicated using carrier interface 23 to support communications with user terminal 235 using transceiver 233, for example, can be communicated over the radio base station bus using bus interface 29 and bus interface 229. Alternately, user payload data communicated using carrier interface 23 to support communications with user terminal 235 using transceiver 233 can be communicated over the radio base station bus using bus interface 27, radio base station node 321 and bus interface 227.

Redundancy can thus be provided in the radio base station bus in that there are multiple paths from any radio base station node on the bus to any other base station node on the bus. Accordingly, a disconnection of any single leg of the radio base station bus of FIG. 2 need not prevent communication between any of the three radio base station nodes on the radio base station bus. Redundancy can also be provided in that disconnection of any one of the carrier buses need not prevent all communication between any radio base station nodes and the mobile switching center 41. If the carrier bus connected to the carrier interface 23 is disconnected, for example, control and user payload data can still be received at the radio base station node 21 through the radio base station node 321 and the radio base station bus.

As shown in the embodiments of FIG. 2, a radio base station bus can include three legs in a bus linking three radio base station nodes. As shown, the radio base station bus can include a first leg between bus interface 27 of radio base station node 21 and bus interface 327 of radio base station node 321, a second leg between bus interface 29 of radio base station node 21 and bus interface 229 of radio base station node 221, and a third leg between bus interface 329 of radio base station node 321 and bus interface 227 of radio base station node 221. Additional nodes could be provided with corresponding additional legs of the radio base station bus.

According to aspects of the present invention, frames of bus data on the radio base station bus, coupling bus interfaces 27, 327, 329, 227, 229, and 29, may have a first number of dedicated control timeslots. Furthermore, frames of carrier data on the carrier bus may have a second number of dedicated control timeslots. The first number of dedicated control timeslots on the radio base station bus can be related to the second number of dedicated control timeslots on the carrier bus as defined by equation (1) above. Alternatively, the first number of dedicated control timeslots on the radio base station bus can be equal to the second number of dedicated control timeslots. The second number of dedicated control timeslots on the carrier bus may be chosen based on the system configuration, paging and messaging requirements and the like. By providing a variable number of dedicated control timeslots on the radio base station bus instead of the fixed number of control timeslots available in conventional systems, embodiments of the present invention may provide an increased number of timeslots per frame for voice and data traffic on the radio base station bus. For example, if the number of control timeslots present in a frame of carrier data between a carrier interface 23 of a radio base station node 21 and a mobile switching center 41 is two, the number of timeslots on the radio base station bus will be at most three, calculated using equation (1) above. Thus, two timeslots that were formerly dedicated to control information in conventional systems are now able to support voice and/or data traffic.

Embodiments of the present invention will now be described with respect to FIGS. 3 and 4, which depict two separate base station nodes of two separate base stations, respectively. Accordingly, the radio base station buses (RBSB) of nodes 421 and 521 do not couple between nodes 421 and 521 and can operate differently. It will be understood that elements of the radio base station nodes of FIGS. 3 and 4 have the same functionality with respect to like named elements discussed above with respect to FIGS. 1 and 2.

Now referring to FIG. 3, radio base station nodes 421 and 521 according to embodiments of the present invention will be discussed in detail. Radio base station node 421 may include carrier interfaces (CI) 423 and 425, bus interfaces (BI) 427 and 429, and transceiver interface (TI) 431. As shown, each carrier interface can be used to communicate carrier data with the mobile switching center (MSC) 441 over respective carrier buses, and each bus interface can be used to communicate bus data with other radio base station nodes over a radio base station bus. In addition, transceiver data for the transceiver 433 can be communicated between the radio base station node 421 and the transceiver 433 through the transceiver interface 431. Accordingly, the radio base station node 421 can support wireless communications with one or more user terminals through transceiver 433 and the mobile switching center 441, the Public Switched Telephone Network (PSTN) 443, and/or another radio base station node.

Furthermore, Radio base station node 521 may include carrier interfaces (CI) 523 and 525, bus interfaces (BI) 527 and 529, and transceiver interface (TI) 531. As shown, each carrier interface can be used to communicate carrier data with the mobile switching center (MSC) 441 over respective carrier buses, and each bus interface can be used to communicate bus data with other radio base station nodes over a radio base station bus. In addition, transceiver data for the transceiver 533 can be communicated between the radio base station node 521 and the transceiver 533 through the transceiver interface 531. Accordingly, the radio base station node 521 can support wireless communications with one or more user terminals through transceiver 533 and the mobile switching center 441, the Public Switched Telephone Network (PSTN) 443, and/or another radio base station node.

According to embodiments of the present invention, a first frame of carrier data is communicated between a carrier interface 423 of a radio base station node 421 and a mobile switching center 441 over a carrier bus and a second frame of carrier data is communicated between a carrier interface 523 of a radio base station node 521 and the mobile switching center 441 over a carrier bus. Radio base station nodes 421 and 521 represent nodes that belong to different radio base stations coupled to the same mobile switching center. Alternatively, radio base station 421 may be coupled to a first mobile switching center and radio base station 521 may be coupled to a second mobile switching center.

Furthermore, a first frame of bus data having a first number of dedicated control timeslots is communicated over a radio base station bus and a second frame of bus data having a second number of dedicated control timeslots is communicated over a second radio base station bus. The second number of dedicated control timeslots is different from the first number of dedicated control timeslots. The number of dedicated control timeslots in the first frame of carrier data may be different from the number of dedicated control timeslots in the second frame of carrier data. In other words, the first frame of carrier data may include a third number of dedicated control timeslots and the second frame of carrier data may include a fourth number of dedicated control timeslots that is different from the third number of dedicated control timeslots. If this is the case, the first number of dedicated control timeslots may be determined using the equation:

$$TS1 = TS3 + 1 \qquad (2)$$

where TS1 is the first number of dedicated control timeslots and TS3 is the third number of dedicated control timeslots. Similarly, the second number of dedicated control timeslots is determined using the equation:

$$TS2 = TS4 + 1 \qquad (3)$$

where TS2 is the first number of dedicated control timeslots and TS4 is the third number of dedicated control timeslots. The additional timeslot on the radio base station bus may be provided for header information that may overflow into an extra timeslot on the radio base station bus. Alternatively, the number of dedicated control timeslots on the carrier bus may be equivalent to the number of dedicated control timeslots on the radio base station bus.

The number of dedicated control timeslots on the carrier bus can be in the range of 1 to 4 dedicated control timeslots. The number of dedicated control timeslots on the radio base station bus can be in the range of 1 to 5 dedicated control timeslots corresponding to the CRI2 standard. These numbers are provided for exemplary purposed only, thus, the present invention should not be limited to the numbers specified by the existing standard, and many other combinations of numbers may be employed without departing from the spirit of the present invention.

Figure 3:
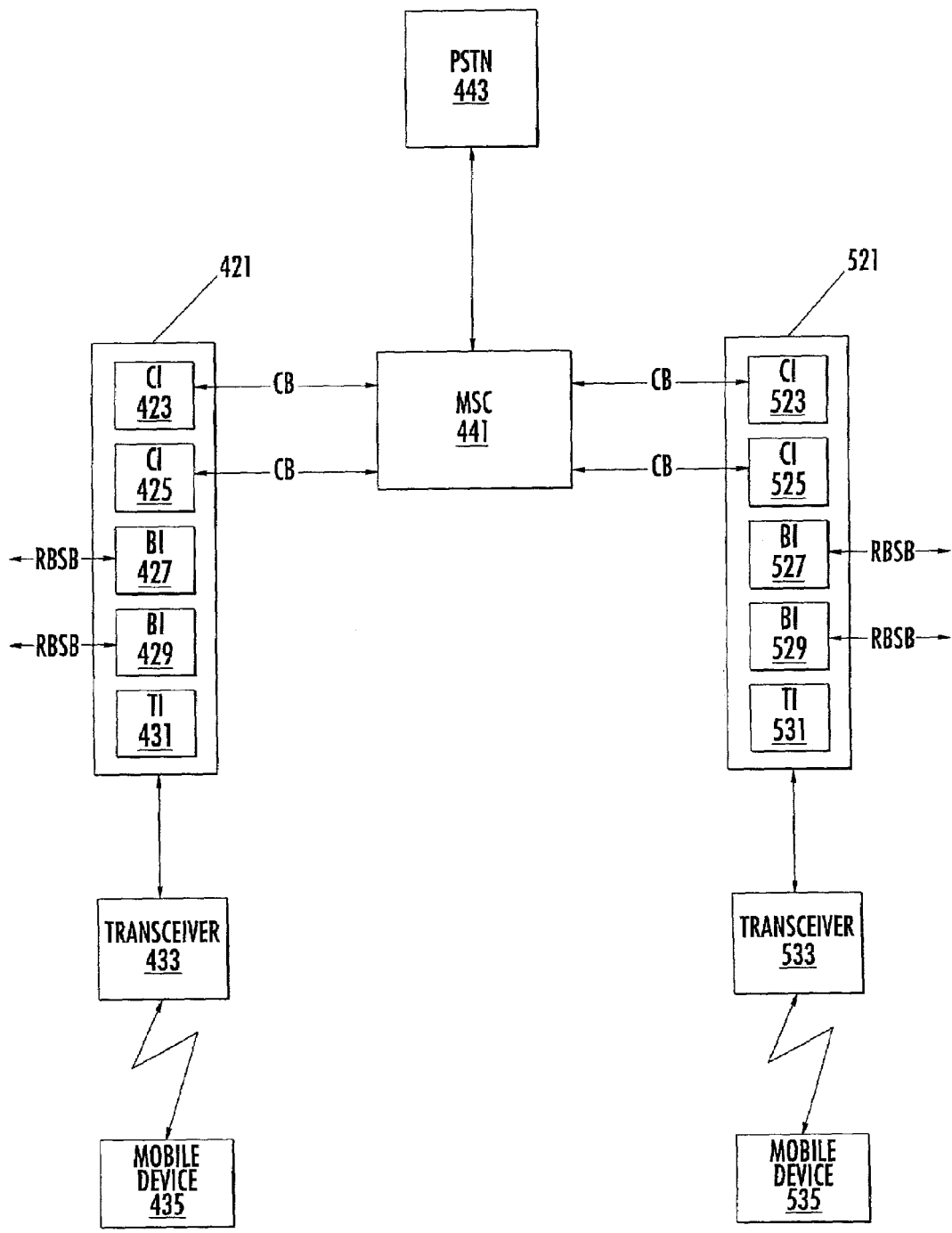
FIG. 3 is a block diagram illustrating radio base station nodes and methods according to embodiments of the present invention.

Accordingly, embodiments of the present invention illustrated in FIG. 3 provide frames of carrier data communicated between a mobile switching center and a radio base station node over a carrier buses with respect to carrier interfaces 423, 425, 523 and 525 (CB). Furthermore, frames of bus data are communicated over the radio base station bus (RBSB) with respect to bus interfaces 427 and 429 and contain a first number of dedicated control timeslots and frames of bus data are communicated over the radio base station bus with respect to bus interfaces 527 and 529 and contain a second number of dedicated control timeslots. Frames of carrier data communicated between a mobile switching center and radio base station nodes over carrier buses with respect to carrier interfaces 423 and 425 may have a different number of dedicated control timeslots than frames of carrier data communicated over carrier buses with respect to carrier interfaces 523 and 525.

Figure 4A:
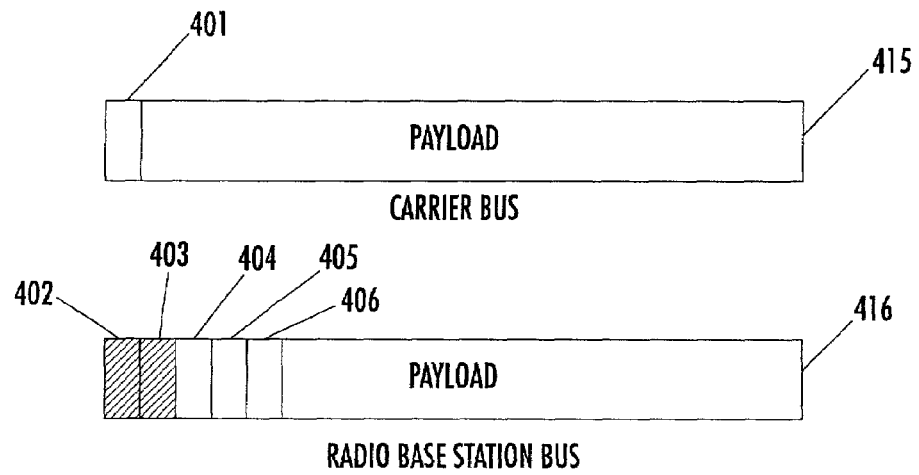
FIGS. 4A and 4B are diagrams illustrating frame structures and methods according to embodiments of the present invention.

In other words, as discussed above, the number of dedicated control timeslots may be determined differently by base station within a radio communications system based on the system configuration, paging, and messaging requirements and the like. In reality, different base stations sharing a mobile switching center may utilize different numbers of control timeslots. An example will now be discussed with respect to FIGS. 4A and 4B. As illustrated in FIG. 4A, a radio base station node, for example, 421, may be allocated a single dedicated control timeslot 401 per frame 415 of carrier data on a carrier bus. The radio base station bus corresponding to this carrier bus may be allocated up to two dedicated control timeslots 402 and 403 per frame 416 of bus data on the radio base station bus. Moreover, the frame 415 of carrier data on the carrier bus may conform to a first protocol, such as the T1, J1, or E1 protocol, and the frame 416 of bus data on the radio base station bus may conform to the same or a different protocol.

Figure 4B:
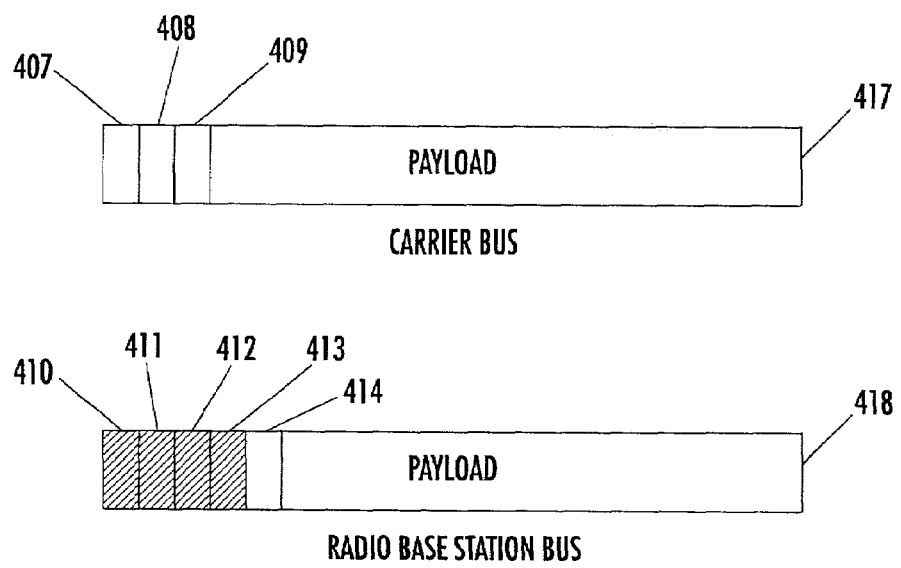

Furthermore, as illustrated in FIG. 4B, radio base station node, for example, 521, may be allocated three dedicated control timeslots 407, 408 and 409 per frame 417 of carrier data on a carrier bus. The radio base station bus corresponding to this carrier bus may be allocated up to four dedicated control timeslots 410, 411, 412, and 413 per frame 418 of bus data on the radio base station bus. Moreover, the frame 417 of carrier data on the carrier bus may conform to a first protocol, such as the T1, J1, or E1 protocol, and the frame 418 of bus data on the radio base station bus may conform to the same or a different protocol. A more detailed description of these protocols and their relationship with one another may be found in related U.S. application Ser. No. 10/011,666 entitled SYSTEMS AND METHODS FOR COMMUNICATING DATA AT RADIO BASE STATION NODES filed concurrently herewith, which is hereby incorporated herein by reference in its entirety.

Thus, this example illustrates that different base stations sharing a mobile switching center may have different requirements which call for different amounts of control information and these different requirements may be accommodated using methods and systems according to embodiments of the present invention discussed above. Furthermore, methods and systems according to embodiments of the present invention may provide more efficient allocation of timeslots to payload traffic on the radio base station bus. As illustrated in FIGS. 4A and 4B, timeslots 404, 405, 406 and 414 on the radio base station bus may be regained for payload traffic because these timeslots may no longer be allocated to control information.

Figure 5:
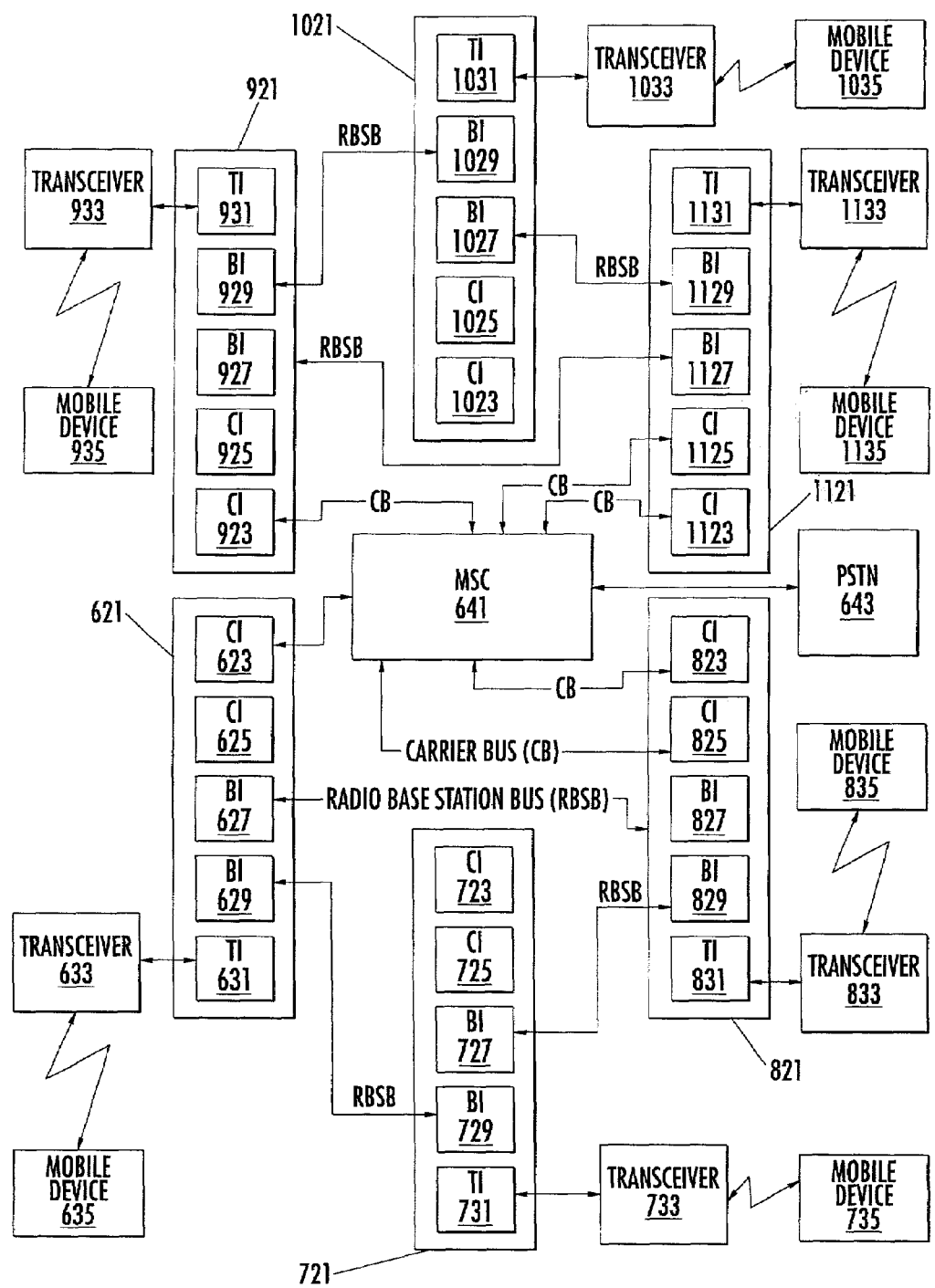
FIG. 5 is a block diagram illustrating a radio communications systems and methods according to embodiments of the present invention.

Now referring to FIG. 5, a radio telephone communications system including a plurality of radio base stations each comprising a plurality of radio base station nodes will be discussed in detail. According to embodiments of the present invention, a first radio base station includes radio base station nodes 621, 721, and 821. As shown, each radio base station node 621, 721, and 821 can be associated with a respective transceiver 633, 733, and 833 to provide wireless communications with respective user terminals 635, 735 and 835. Furthermore, a second radio base station includes radio base station nodes 921, 1021, and 1121. As shown, each radio base station node 921, 1021 and 1121 can be associated with a respective transceiver 933, 1033, and 1133 to provide wireless communications with respective user terminals 935, 1035 and 1135.

It will be understood that while a single user terminal is shown in communication with each transceiver, each transceiver may provide communications with a plurality of user terminals and that there may be times when a transceiver is not providing communications with any user terminals. In the example of FIG. 5, each transceiver or transceiver group may be used to provide service over a 120 degree sector of the first radio base station or the second radio base station so that each of the illustrated transceiver groups and radio base station nodes is part of the first base station or the second base station.

Frames of carrier data may be communicated on carrier buses with respect to the first base station including radio base station nodes 621, 721, and 821 and frames of carrier data may also be communicated on carrier buses with respect to the second base station including radio base station nodes 921, 1021, and 1121. Frames of bus data may be communicated on the radio base station buses of the first radio base station and the second radio base station. Frames of bus data on the radio base station bus, coupling bus interfaces 627, 827, 829, 727, 729, and 629, may have a first number of dedicated control timeslots and frames of bus data on the radio base station bus, coupling bus interfaces 927, 1127, 1129, 1027, 1029, and 1029, may have a second number of dedicated control timeslots. The first number of dedicated control timeslots may be related to the number of dedicated control timeslots on the carrier bus of the first base station defined by radio base station nodes 621, 721, and 821. Furthermore, the second number of dedicated control timeslots may be related to the number of dedicated control timeslots on the carrier bus of the second base station defined by radio base station nodes 921, 1021, and 1121. The number of dedicated control timeslots per frame on the carrier buses of the first and second base stations may be different.

Accordingly, different base stations in a system may be provided with different allocation of control data. Embodiments of the present invention provide methods and systems that address these different control data allocations and provide efficient use of a limited number of timeslots per frame, i.e. 24 timeslots using a T1 carrier protocol. The variability of the number of dedicated control timeslots from one base station to another provides an efficient system that may utilize an increased number of timeslots per frame for voice and data.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method for communicating data in a radio communications system, the method comprising:
communicating a first frame of cater data between a first carrier interface of a first radio base station node and a mobile switching center over a first carrier bus;
communicating a first flame of bus data having a first number of dedicated control timeslots at a first bus interface of the first radio base station node over a first radio base station bus;
communicating a second frame of carrier data between a second carrier interface of a second radio base station node and the mobile switching center over a second carrier bus; and
communicating a second frame of bus data having a second number of dedicated control timeslots, different from the first number of dedicated control timeslots, at a second bus interface of the second radio base station node over a second radio base station bus.

2. The method of claim 1, wherein the first frame of carrier data includes a third number of dedicated control timeslots and wherein the second frame of carrier data includes a fourth number of dedicated control timeslots that is different from the third number of dedicated control timeslots.

3. The method of claim 2, wherein the third number of dedicated control timeslots is determined based on at least one of the system configuration, paging requirements and messaging requirements.

4. The method of claim 2:
wherein the first number of dedicated control timeslots is determined using the equation $TS1=TS3+1$, where $TS1$ is the first number of dedicated control timeslots and $TS3$ is the third number of dedicated control timeslots; and
wherein the second number of dedicated control timeslots is determined using the equation $TS2=TS4+1$, where $TS2$ is the second number of dedicated control timeslots and $TS4$ is the fourth number of dedicated control timeslots.

5. The method of claim 2, wherein the first number of dedicated control timeslots is equivalent to the third number of dedicated control timeslots, and wherein second number of dedicated control timeslots is equivalent to the fourth number of control timeslots.

6. The method of claim 2, wherein the first and second numbers of dedicated control timeslots are in the range of 1 dedicated control timeslot to 5 dedicated control timeslots, and wherein the second and third numbers of dedicated control timeslots are in the range of 1 dedicated control timeslot to 4 dedicated control timeslots.

7. The method of claim 2, wherein the dedicated control timeslots contain control data.

8. The method of claim 7, wherein the control data contained in the first number of dedicated control timeslots on the radio base station bus is related to the control data contained in the third number of dedicated control timeslots on the carrier bus, and wherein the control data in the second number of dedicated control timeslots on the radio base station bus is related to the control data contained in the fourth number of dedicated control timeslots on the carrier bus.

9. The method of claim 7, wherein all of the control data contained in the third number of dedicated control timeslots on the carrier bus is communicated in the first number of dedicated control timeslots on the radio base station bus, and wherein all of the control data contained in the fourth number of dedicated control timeslots on the carrier bus is communicated in the second number of dedicated control timeslots on the radio base station bus.

10. The method of claim 7, wherein the control data comprises at least one of operations and maintenance data, air interface signaling information, short message service (SMS) data and mobile control information.

11. The method of claim 1 where the mobile switching center comprises:
a first mobile switching center that communicates with the first carrier interface of the first radio base station node; and
a second mobile switching center that communicates with the second carrier interface of the second radio base station node.

12. The method of claim 1:
wherein the first radio base station bus is coupled between the first bus interface of the first radio base station node and a third bus interface of a third radio base station node so that the first frame of bus data is communicated between the first and third radio base station nodes over the first radio base station bus; and
wherein the second radio base station bus is coupled between the second bus interface of the second radio base station node and a fourth bus interface of a fourth radio base station node so that the second frame of bus data is communicated between the second and fourth radio base station nodes over to second radio base station bus.

13. A method of communicating data, the method comprising:
communicating a frame of carrier data having a first number of dedicated control timeslots between a carrier interface of a first radio base station node and a mobile switching center over a carrier bus; and
communicating a frame of bus data having a second number of dedicated control timeslots at a bus interface of the first radio base station node over a radio base station bus, wherein the second number of dedicated control timeslots is defined by the equation TS2=TS1+1, where TS2 is the second number of dedicated control timeslots and TS1 is the first number of dedicated control timeslots, and wherein TS2 is less than 5.

14. The method of claim 13, wherein the dedicated control timeslots contain control data.

15. The method of claim 14, wherein control data contained in the first number of dedicated control timeslots is related to the control data contained in the second number of dedicated control timeslots.

16. The method of claim 14, wherein the control data comprises at least one of operations and maintenance data, air interface signaling information, short message service data and mobile control information.

17. The method of claim 13, wherein the radio base station bus is coupled between a first bus interface of the first radio base station node and a second bus interface of a second radio base station node so that the frame of bus data is communicated between the first and second radio base station nodes over the radio base station bus.

18. A radio communications system comprising:
a first radio base station node having a first carrier interface that is configured to communicate a first frame of carrier data between the first radio base station node and a mobile switching center over a first carrier bus, and a first bus interface that is configured to communicate a second frame of bus data having a first number of dedicated control timeslots, over a first radio base station bus; and
a second radio base station node having a second carrier interface that is configured to communicate a second frame of carrier data between the second radio base station node and the mobile switching center over a second carrier bus, and a second bus interface that is configured to communicate a second frame of bus data having a second number of dedicated control timeslots, different from the first number of dedicated control timeslots, over a second radio base station bus.

19. The system of claim 18, wherein the first carrier interface is further configured to communicate the first frame of carrier data having a third number of dedicated control timeslots, and wherein the second carrier interface is further configured to communicate the second frame of carrier data having a fourth number of dedicated control timeslots that is different from the third number of dedicated control timeslots.

20. The system of claim 18 wherein the mobile switching center comprises:
a first mobile switching center that is configured to communicate with the first carrier interface of the first radio base station node; and
a second mobile switching center that is configured to communicate with the second carrier interface of the second radio base station node.

21. The system of claim 18:
wherein the first radio base station bus is further configured to provide a route between the first bus interface of the first radio base station node and third bus interface of a third radio base station node so that the first frame of bus data is communicated between the first and third radio base station nodes over the first radio base station bus; and
wherein the second radio base station bus is further configured to provide a route between the second bus interface of the second radio base station node and a fourth bus interface of a fourth radio base station node so that the second frame of bus data is communicated between the second and fourth radio base station nodes over the second radio base station bus.

22. A first radio base station node comprising:
a first carrier interface that is configured to communicate a frame of carrier data having a first number of dedicated control timeslots between the first radio base station node and a mobile switching center over a carrier bus; and
a first bus interface that is configured to communicate over a radio base station bus having a second number of dedicated control timeslots, wherein the second number of dedicated control timeslots is calculated using the equation TS2+TS1+1, where TS2 is the second number of dedicated control timeslots and TS1 is the first number of dedicated control timeslots, and wherein TS2 is less than 5.

23. The first radio base station node of claim 22, wherein the dedicated control timeslots contain control data.

24. The first radio base station of claim 23, wherein control data contained in the first number of dedicated control timeslots is related to the control data contained in the second number of dedicated control timeslots.

25. The first radio base station bus of claim 23, wherein the control data comprises at least one of operations and maintenance data, air interface signaling information, short message service data and mobile control information.

26. The first radio base station bus of claim 22, wherein the first radio base station bus is coupled between the first bus interface of the first radio base station node and a second bus interface of a second radio base station node so that the frame of bus data is communicated between the first and second radio base station nodes over the radio base station bus.

* * * * *

UNITED STATES PATENT AND TRADEMARK OFFICE
CERTIFICATE OF CORRECTION

| | |
|---|---|
| PATENT NO. | : 7,061,884 B2 |
| APPLICATION NO. | : 10/011669 |
| DATED | : June 13, 2006 |
| INVENTOR(S) | : Shepherd et al. |

It is certified that error appears in the above-identified patent and that said Letters Patent is hereby corrected as shown below:

Column 10,
Line 31 should read -- communicating a first frame of carrier data between a first --

Line 34 should read -- communicating a first frame of bus data having a first --

Column 13,
Line 13 should read -- using the equation TS2=TS1+1, where TS2 is the --

Signed and Sealed this

Twenty-first Day of November, 2006

JON W. DUDAS
*Director of the United States Patent and Trademark Office*